US007228277B2

(12) United States Patent
Nagashima

(10) Patent No.: US 7,228,277 B2
(45) Date of Patent: Jun. 5, 2007

(54) MOBILE COMMUNICATIONS TERMINAL, VOICE RECOGNITION METHOD FOR SAME, AND RECORD MEDIUM STORING PROGRAM FOR VOICE RECOGNITION

(75) Inventor: Yoshihisa Nagashima, Tokyo (JP)

(73) Assignee: NEC Corporation, Tokyo (JP)

( * ) Notice: Subject to any disclaimer, the term of this patent is extended or adjusted under 35 U.S.C. 154(b) by 870 days.

(21) Appl. No.: 10/015,881

(22) Filed: Dec. 17, 2001

(65) Prior Publication Data

US 2002/0082832 A1 Jun. 27, 2002

(30) Foreign Application Priority Data

Dec. 25, 2000 (JP) ............................. 2000-393709

(51) Int. Cl.
*G10L 15/06* (2006.01)
(52) U.S. Cl. ...................... 704/250; 704/255; 704/270; 704/275
(58) Field of Classification Search ............. 704/270.1, 704/275, 250, 246, 251; 379/67, 201; 455/566
See application file for complete search history.

(56) References Cited

U.S. PATENT DOCUMENTS

| 4,961,212 A * | 10/1990 | Marui et al. ............. 379/88.03 |
| 5,978,806 A * | 11/1999 | Lund ........................... 707/10 |
| 6,157,844 A | 12/2000 | Doran et al. |
| 6,178,403 B1 * | 1/2001 | Detlef ......................... 704/270 |
| 6,462,616 B1 * | 10/2002 | Beswick et al. ......... 379/88.03 |
| 6,463,413 B1 * | 10/2002 | Applebaum et al. ..... 704/256.2 |
| 6,823,306 B2 * | 11/2004 | Reding et al. ............. 704/244 |
| 2002/0072917 A1 * | 6/2002 | Irvin et al. ............... 704/270.1 |
| 2002/0118800 A1 * | 8/2002 | Martinez et al. ........... 379/67.1 |

FOREIGN PATENT DOCUMENTS

| CN | 2136559 Y | 6/1993 |
| CN | 1255033 A | 5/2000 |
| DE | 197 51 170 A1 | 6/1999 |

(Continued)

*Primary Examiner*—David Hudspeth
*Assistant Examiner*—Matthew J. Sked
(74) *Attorney, Agent, or Firm*—Sughrue Mion, PLLC

(57) ABSTRACT

A voice input section receives voice of the user designating a name etc. and outputs a voice signal to a speech recognition section. The speech recognition section analyzes and recognizes the voice signal and thereby obtains voice data. The voice data is compared with voice patterns that have been registered in the mobile communications terminal corresponding to individuals etc. and thereby a voice pattern that most matches the voice data is searched for and retrieved. If the retrieval of a matching voice pattern succeeded, a memory search processing section refers to a voice-data correspondence table and thereby calls up a telephone directory that has been registered corresponding to the retrieved voice pattern. In each telephone directory, various types of data (telephone number, mail address, URL, etc.) of an individual etc. to be used for starting communication have been registered previously. The type of data to be called up is designated by button operation etc. When a telephone directory is called up, data of the designated type is called up from the telephone directory and used for starting communication. By the employment of the telephone directories, the speech recognition rate can be maintained high even if the number of registered data increased, thereby operability of the mobile communications terminal can be improved.

24 Claims, 5 Drawing Sheets

FOREIGN PATENT DOCUMENTS

| | | |
|---|---|---|
| EP | 0 854 417 A2 | 7/1998 |
| GB | 2 225 675 A | 7/1990 |
| JP | 03-045057 A | 2/1991 |
| JP | 10-3294 A | 1/1998 |
| JP | 11-065590 A | 3/1999 |
| JP | 2000-078262 A | 3/2000 |
| JP | 2000-151760 A | 5/2000 |
| JP | 2000-270080 A | 9/2000 |
| WO | WO 98/56151 A1 | 12/1998 |

* cited by examiner

MOBILE COMMUNICATIONS TERMINAL, VOICE RECOGNITION METHOD FOR SAME, AND RECORD MEDIUM STORING PROGRAM FOR VOICE RECOGNITION

BACKGROUND OF THE INVENTION

The present invention relates to a mobile communications terminal, a speech recognition method for the mobile communications terminal, and a record medium storing a program for the speech recognition, by which personal data (telephone numbers, mail addresses, URLs (Uniform Resource Locators), etc.) to be used for starting communication can be searched for and called up easily by use of speech recognition techniques (which are generally employed for improving operability of mobile communications terminals) maintaining a high speech recognition rate.

DESCRIPTION OF THE RELATED ART

These days, speech recognition techniques are going to be employed for mobile communications terminals (such as cellular phones, PHS phones (in Japan), etc.) for letting the user search for and call up personal data (telephone number, mail address, URL, etc. to be used for starting communication with individuals etc.) easily. With such a mobile communications terminal employing speech recognition techniques, the user sounds out a word (corresponding to an individual to which the user wants to make a call) to a microphone etc. of the mobile communications terminal and thereby a telephone number or a telephone directory corresponding to the individual is automatically searched for and called up. By use of the speech recognition techniques, the user is released from the troublesome key operation which is necessary for making calls.

FIG. 1 is a block diagram showing an example of the composition of a conventional mobile communications terminal which employs speech recognition techniques. Voice of the user sounding out a name etc. is received by a voice input section 1 (including a handset, a microphone, or an externally added voice input device) and a voice signal outputted by the voice input section 1 is inputted to a speech recognition section 2. The speech recognition section 2 analyzes and recognizes the voice signal and thereby outputs voice data.

The voice data outputted by the speech recognition section 2 is compared with voice patterns 51 by a voice search processing section 5, thereby a voice pattern 51 that has been stored in the voice search processing section 5 and that is most similar to the voice data is retrieved. If the retrieval of a matching voice pattern 51 succeeded, a voice-data correspondence table 50 is referred to by a memory search processing section 3 and thereby a telephone number 52 that has been registered in the mobile communications terminal and that matches the retrieved voice pattern 51 is searched for and retrieved. The result of the search for a telephone number 52 can be displayed on a display section 4. Thereafter, the user can make a call by use of the retrieved telephone number 52 and via a communication control section 6, a transmission/reception section 7 and an antenna 8.

However, the conventional mobile communications terminal which has been explained above involves the following problems or drawbacks.

First, the speech recognition rate of the mobile communications terminal is necessitated to deteriorate when the number of voice patterns 51 registered and stored in the mobile communications terminal gets larger. When a lot of voice patterns 51 have been registered in the mobile communications terminal and a voice pattern 51 that matches the voice sounded out by the user is searched for, the probability of misretrieval (erroneously retrieving a different and similar voice pattern) becomes higher. Therefore, a certain upper limit has to be put on the number of voice patterns 51 which are registered in the mobile communications terminal in order to ensure a high speech recognition rate.

Second, the utilization of mobile communications terminals is diversifying today and the mobile communications terminals are being used not only for making phone calls but also for sending E-mails, making access to the Internet, etc. In such a situation, measures for releasing the users from the troublesome key operation are being sought after. If the aforementioned speech recognition techniques are employed for a mobile communications terminal in order to resolve the problem and if personal data (URLs and E-mail addresses) for the connection to the Internet and E-mail are managed together with telephone numbers by use of only one voice-data correspondence table, a still larger number of voice patterns have to be registered in the voice-data correspondence table, thereby the speech recognition rate is necessitated to be deteriorated further. In order to maintain a high speech recognition rate, the number of registered voice patterns (or registered individuals) has to be reduced much.

Third, a voice pattern can not be associated with two or more words or functions. If two or more functions are assigned to a voice pattern, conflicts might occur between the functions.

SUMMARY OF THE INVENTION

It is therefore the primary object of the present invention to provide a mobile communications terminal, a speech recognition method for the mobile communications terminal, and a record medium storing a program for the speech recognition, by which personal data (telephone numbers, mail addresses, URLs, etc.) to be used for starting communication can be searched for and called up easily by use of speech recognition techniques, maintaining a high speech recognition rate.

In accordance with a first aspect of the present invention, there is provided a mobile communications terminal comprising a voice pattern/telephone directory registration means (5), a voice input means (1), a speech recognition means (2) and a memory search processing means (3). In the voice pattern/telephone directory registration means (5), telephone directories (55), each of which includes various types of data (52, 53, 54) to be used for starting communication with a target of communication, are registered and voice patterns corresponding to the telephone directories (55) are registered. The voice input means (1) receives voice of a user designating a target of communication and thereby outputs a voice signal. The speech recognition means (2) analyzes and recognizes the voice signal outputted by the voice input means (1) and thereby obtaining voice data, compares the obtained voice data with the voice patterns (51) that have been registered in the voice pattern/telephone directory registration means (5), and thereby searches for and retrieves a voice pattern (51) that matches or nearly matches the obtained voice data. The memory search processing means (3) calls up a telephone directory (55) that has been registered in the voice pattern/telephone directory registration means (5) corresponding to the voice pattern (51) retrieved by the speech recognition means (2).

In accordance with a second aspect of the present invention, in the first aspect, the telephone directory (55) at least includes a telephone number (52), a mail address (53) and a URL (Uniform Resource Locator) (54).

In accordance with a third aspect of the present invention, in the first aspect, the mobile communications terminal further comprises a data type designation means (92, 93, 94). The data type designation means (92, 93, 94) lets the user designate the type of data to be called up from the various types of data (52, 53, 54) of the telephone directory (55).

In accordance with a fourth aspect of the present invention, in the first aspect, the memory search processing means (3) automatically designates the type of data to be called up from the various types of data (52, 53, 54) of the telephone directory (55) based on application activation status of the mobile communications terminal.

In accordance with a fifth aspect of the present invention, in the first aspect, the mobile communications terminal further comprises a display means (4) for displaying data of the telephone directory (55) called up by the memory search processing means (3).

In accordance with a sixth aspect of the present invention, in the first aspect, the mobile communications terminal further comprises a communication starting means (6, 7, 8) for automatically starting communication with the target designated by the user by use of data of the telephone directory (55) called up by the memory search processing means (3).

In accordance with a seventh aspect of the present invention, there is provided a mobile communications terminal comprising a voice pattern/data registration means (5), a data type designation means (92, 93, 94, 3), a voice input means (1), a speech recognition means (2) and a memory search processing means (3). In the voice pattern/data registration means (5), various types of data (52, 53, 54) to be used for starting communication with targets of communication are registered and voice patterns corresponding to each data (52, 53, 54) are registered with regard to each data type (52, 53, 54) independently. The data type designation means (92, 93, 94, 3) is used for designating the type of data (52, 53, 54) to be called up. The voice input means (1) receives voice of a user designating a target of communication and thereby outputs a voice signal. The speech recognition means (2) analyzes and recognizes the voice signal outputted by the voice input means (1) and thereby obtains voice data, compares the obtained voice data with voice patterns (51) that have been registered in the voice pattern/data registration means (5) with regard to the data type (52, 53, 54) designated by the data type designation means (92, 93, 94, 3), and thereby searches for and retrieves a voice pattern (51) that matches or nearly matches the obtained voice data. The memory search processing means (3) calls up data (52, 53, 54) of the type designated by the data type designation means (92, 93, 94, 3) that has been registered in the voice pattern/data registration means (5) corresponding to the voice pattern (51) retrieved by the speech recognition means (2).

In accordance with an eighth aspect of the present invention, in the seventh aspect, the various types of data (52, 53, 54) at least includes a telephone number (52), a mail address (53) and a URL (Uniform Resource Locator) (54).

In accordance with a ninth aspect of the present invention, in the seventh aspect, the data type designation means (92, 93, 94) lets the user designate the type of data to be called up.

In accordance with a tenth aspect of the present invention, in the seventh aspect, the data type designation means (92, 93, 94) automatically designates the type of data to be called up based on application activation status of the mobile communications terminal.

In accordance with an eleventh aspect of the present invention, in the seventh aspect, the mobile communications terminal further comprises a display means (4) for displaying the data called up by the memory search processing means (3).

In accordance with a twelfth aspect of the present invention, in the seventh aspect, the mobile communications terminal further comprises a communication starting means (6, 7, 8) for automatically starting communication with the target designated by the user by use of the data called up by the memory search processing means (3).

In accordance with a thirteenth aspect of the present invention, there is provided a speech recognition method for a mobile communications terminal, comprising a voice pattern/telephone directory registration step, a voice input step, a speech recognition step, and a memory search step. In the voice pattern/telephone directory registration step, telephone directories (55), each of which includes various types of data (52, 53, 54) to be used for starting communication with a target of communication, are registered and voice patterns (51) corresponding to the telephone directories (55) are registered. In the voice input step, voice of a user designating a target of communication is received and thereby a voice signal is generated. In the speech recognition step, the voice signal generated in the voice input step is analyzed and recognized and thereby voice data is obtained, the obtained voice data is compared with the voice patterns (51) that have been registered in the voice pattern/telephone directory registration step, and thereby a voice pattern (51) that matches or nearly matches the obtained voice data is searched for and retrieved. In the memory search step, a telephone directory (55) that has been registered in the voice pattern/telephone directory registration step corresponding to the voice pattern (51) retrieved in the speech recognition step is called up.

In accordance with a fourteenth aspect of the present invention, in the thirteenth aspect, the telephone directory (55) at least includes a telephone number (52), a mail address (53) and a URL (Uniform Resource Locator) (54).

In accordance with a fifteenth aspect of the present invention, in the thirteenth aspect, the speech recognition method for a mobile communications terminal further comprises a data type designation step. In the data type designation step, the type of data to be called up from the various types of data (52, 53, 54) of the telephone directory (55) is designated by the user.

In accordance with a sixteenth aspect of the present invention, in the thirteenth aspect, in the memory search step, the type of data to be called up from the various types of data (52, 53, 54) of the telephone directory (55) is automatically designated based on application activation status of the mobile communications terminal.

In accordance with a seventeenth aspect of the present invention, in the thirteenth aspect, the speech recognition method for a mobile communications terminal further comprises a display step. In the display step, data of the telephone directory (55) called up in the memory search step is displayed.

In accordance with an eighteenth aspect of the present invention, in the thirteenth aspect, the speech recognition method for a mobile communications terminal further comprises a communication starting step. In the communication starting step, communication with the target designated by the user is automatically started by use of data of the telephone directory (55) called up in the memory search step.

In accordance with a nineteenth aspect of the present invention, there is provided a speech recognition method for a mobile communications terminal, comprising a voice pattern/data registration step, a data type designation step, a voice input step, a speech recognition step, and a memory search step. In the voice pattern/data registration step, various types of data (52, 53, 54) to be used for starting communication with targets of communication are registered and voice patterns corresponding to each data (52, 53, 54) are registered with regard to each data type (52, 53, 54) independently. In the data type designation step, the type of data (52, 53, 54) to be called up is designated. In the voice input step, voice of a user designating a target of communication is received and thereby a voice signal is generated. In the speech recognition step, the voice signal generated in the voice input step is analyzed and recognized and thereby voice data is obtained, the obtained voice data is compared with voice patterns (51) that have been registered in the voice pattern/data registration step with regard to the data type (52, 53, 54) designated in the data type designation step, and thereby a voice pattern (51) that matches or nearly matches the obtained voice data is searched for and retrieved. In the memory search step, data (52, 53, 54) of the type designated in the data type designation step that has been registered in the voice pattern/data registration step corresponding to the voice pattern (51) retrieved in the speech recognition step is called up.

In accordance with a twentieth aspect of the present invention, in the nineteenth aspect, the various types of data (52, 53, 54) at least includes a telephone number (52), a mail address (53) and a URL (Uniform Resource Locator) (54).

In accordance with a twenty-first aspect of the present invention, in the nineteenth aspect, the type of data to be called up is designated by the user in the data type designation step.

In accordance with a twenty-second aspect of the present invention, in the nineteenth aspect, the type of data to be called up is automatically designated based on application activation status of the mobile communications terminal in the data type designation step.

In accordance with a twenty-third aspect of the present invention, in the nineteenth aspect, the speech recognition method for a mobile communications terminal further comprises a display step. In the display step, the data called up in the memory search step is displayed.

In accordance with a twenty-fourth aspect of the present invention, in the nineteenth aspect, the speech recognition method for a mobile communications terminal further comprises a communication starting step. In the communication starting step, communication with the target designated by the user is automatically started by use of the data called up in the memory search step.

In accordance with twenty-fifth through thirty-sixth aspects of the present invention, there are provided machine-readable record mediums storing programs for instructing a computer, an MPU (MicroProcessor Unit), etc. of a mobile communications terminal to execute the speech recognition methods of the thirteenth through twenty-fourth aspects of the present invention.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Figure 1:
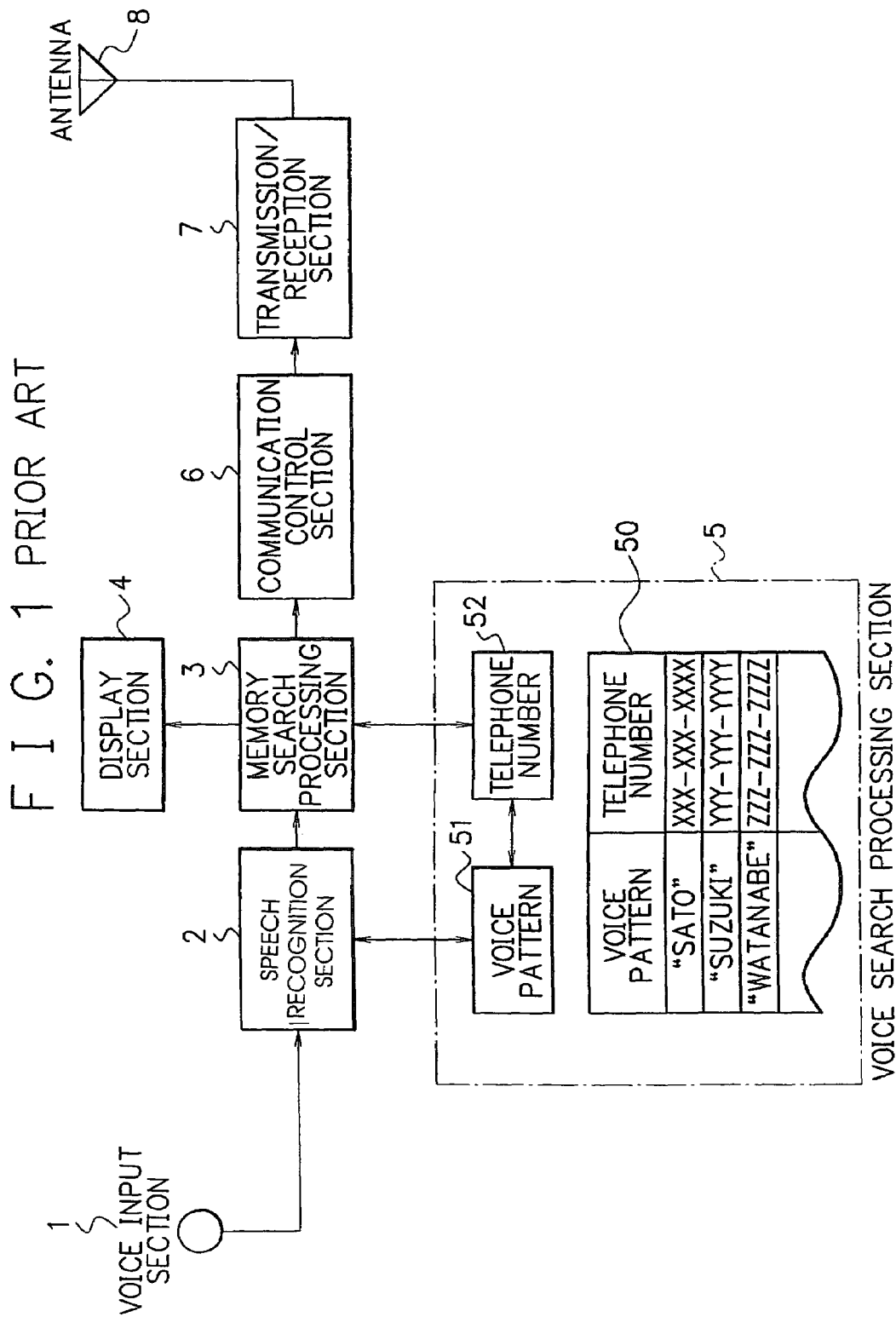
FIG. 1 is a block diagram showing an example of the composition of a conventional mobile communications terminal which employs speech recognition techniques.

Referring now to the drawings, a description will be given in detail of preferred embodiments in accordance with the present invention.

Embodiment 1

Figure 2:
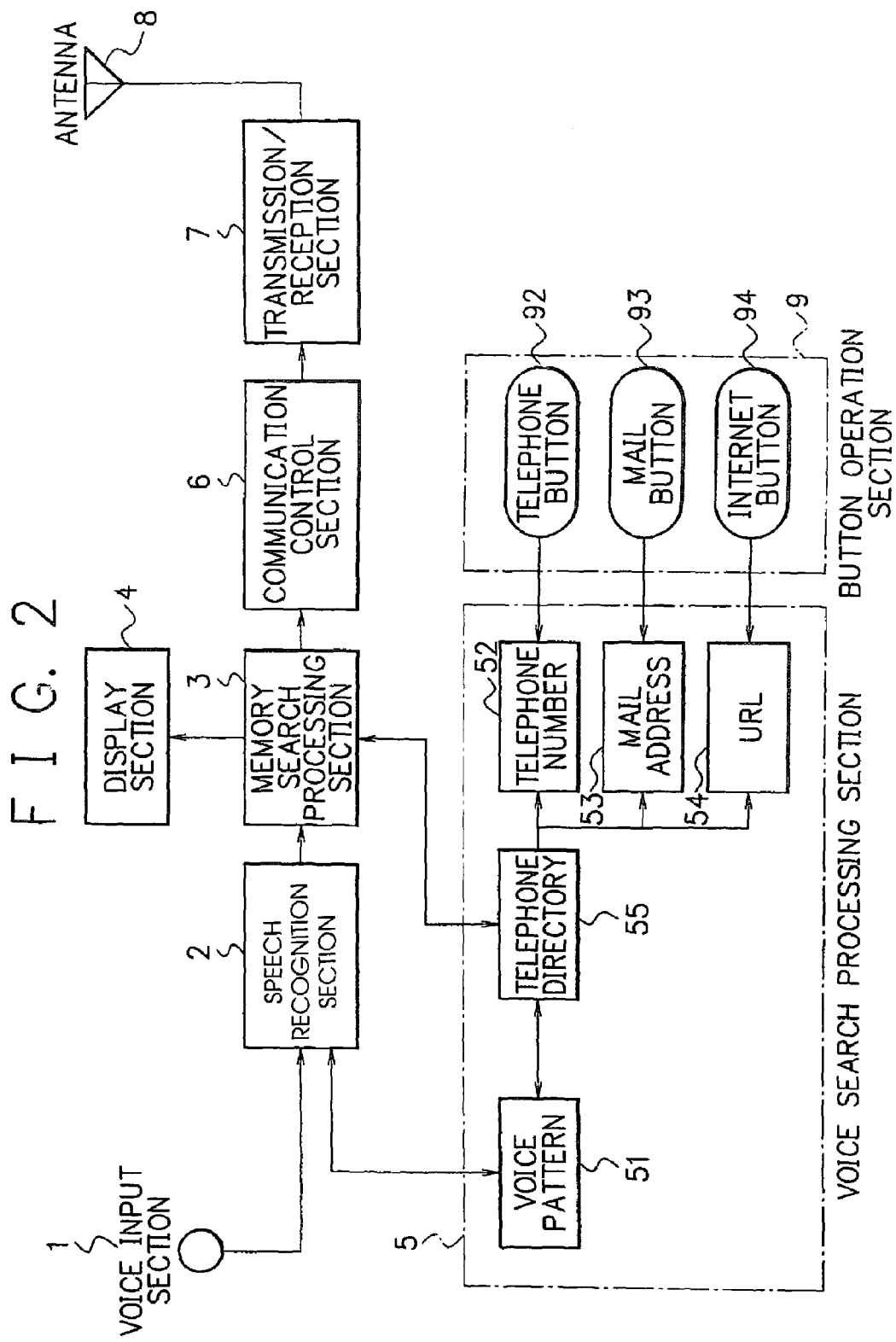
FIG. 2 is a block diagram showing an example of the composition of a mobile communications terminal in accordance with a first embodiment of the present invention.

FIG. 2 is a block diagram showing an example of the composition of a mobile communications terminal in accordance with a first embodiment of the present invention. The mobile communications terminal of the first embodiment includes a voice input section 1, a speech recognition section 2, a memory search processing section 3, a display section 4, a voice search processing section 5, a communication control section 6, a transmission/reception section 7, an antenna 8, and a button operation section 9.

The voice input section 1, which includes a handset, a microphone, or an externally added voice input device, has a function of electrically transferring the voice of the user to the speech recognition section 2. In other words, the voice input section 1 receives voice of the user and outputs a voice signal to the speech recognition section 2. The speech recognition section 2 receives the voice signal from the voice input section 1, obtains voice data by analyzing and recognizing the voice signal, and compares the obtained voice data with one or more voice patterns 51 that have been registered and stored in the voice search processing section 5.

The memory search processing section 3 searches for a telephone directory 55 (personal data of an individual) out of a plurality of telephone directories 55 that have been registered and stored in the voice search processing section 5. Each telephone directory 55 is generated with regard to each individual, and in each telephone directory 55, personal data of an individual such as a telephone number 52, a mail address (E-mail address) 53, a URL (Uniform Resource Locator) 54, etc. are registered.

The telephone directories 55 are provided to the mobile communications terminal in order to cope with the diversification of measures for communicating with individuals. Although the measures for communicating with individuals used to be limited to telephone, postal mail, etc., with the explosive spread of the Internet, E-mail and home pages (leaving messages on personal home pages) have become popular as the communication measures. Therefore, various personal data (telephone number 52, mail address 53, URL

54, etc.) have to be registered as contact addresses of each individual. If a voice pattern 51 is directly associated with a piece of personal data (a telephone number 52, a mail address 53 or a URL 54) as in the prior art, the number of voice patterns 51 which are registered in the mobile communications terminal easily exceeds the aforementioned upper limit which ensures a high speech recognition rate. On the other hand, by use of the telephone directories 55, a one-to-one correspondence between a voice pattern 51 and an individual is attained and thereby the number of voice patterns 51 that have to be registered in the mobile communications terminal can be reduced.

The voice search processing section 5 stores a one-to-one voice-data correspondence table between the voice patterns 51 (which will be explained in detail later) and the telephone directories 55. The voice search processing section 5 also stores the telephone directories 55 each of which corresponds to each individual. Each telephone directory 55 corresponding to an individual includes a telephone number 52, a mail address (E-mail address) 53, a URL 54, etc. as mentioned before. The type of personal data (telephone number 52, mail address 53, URL 54, etc.) to be searched for and called up is determined by the user's key operation (button operation) to the button operation section 9 as will be explained below. The result of the search for a telephone directory 55 corresponding to the voice pattern 51 retrieved by the speech recognition section 2 is displayed on the display section 4 by the memory search processing section 3.

The button operation section 9 is provided with a TELEPHONE button 92, a MAIL button 93 and an INTERNET button 94. The voice search processing section 5 is informed of ON/OFF statuses of the buttons 92, 93 and 94 (or change of the status of the mobile communications terminal due to button operation). By use of the buttons 92, 93 and 94, the type of data (telephone number 52, mail address 53, URL 54, etc.) to be called up can be designated. The TELEPHONE button 92, the MAIL button 93 and the INTERNET button 94 can be assigned to any buttons of the mobile communications terminal if they can be operated independently.

The designation of data type can also be done without using the buttons 92, 93 and 94, that is, by letting the voice search processing section 5 know the current operation mode of the mobile communications terminal. For example, when the mobile communications terminal is in its normal mode, a telephone number 52 is automatically designated and called up. When a mail software has been activated, a mail address 53 is automatically designated and called up. When a Web browser has been activated, a URL 54 is automatically designated and called up. Based on the result of the search for personal data, communication (call origination, sending E-mail, or access to the Internet) is started by use of the communication control section 6, the transmission/reception section 7 and the antenna 8.

Figure 3:
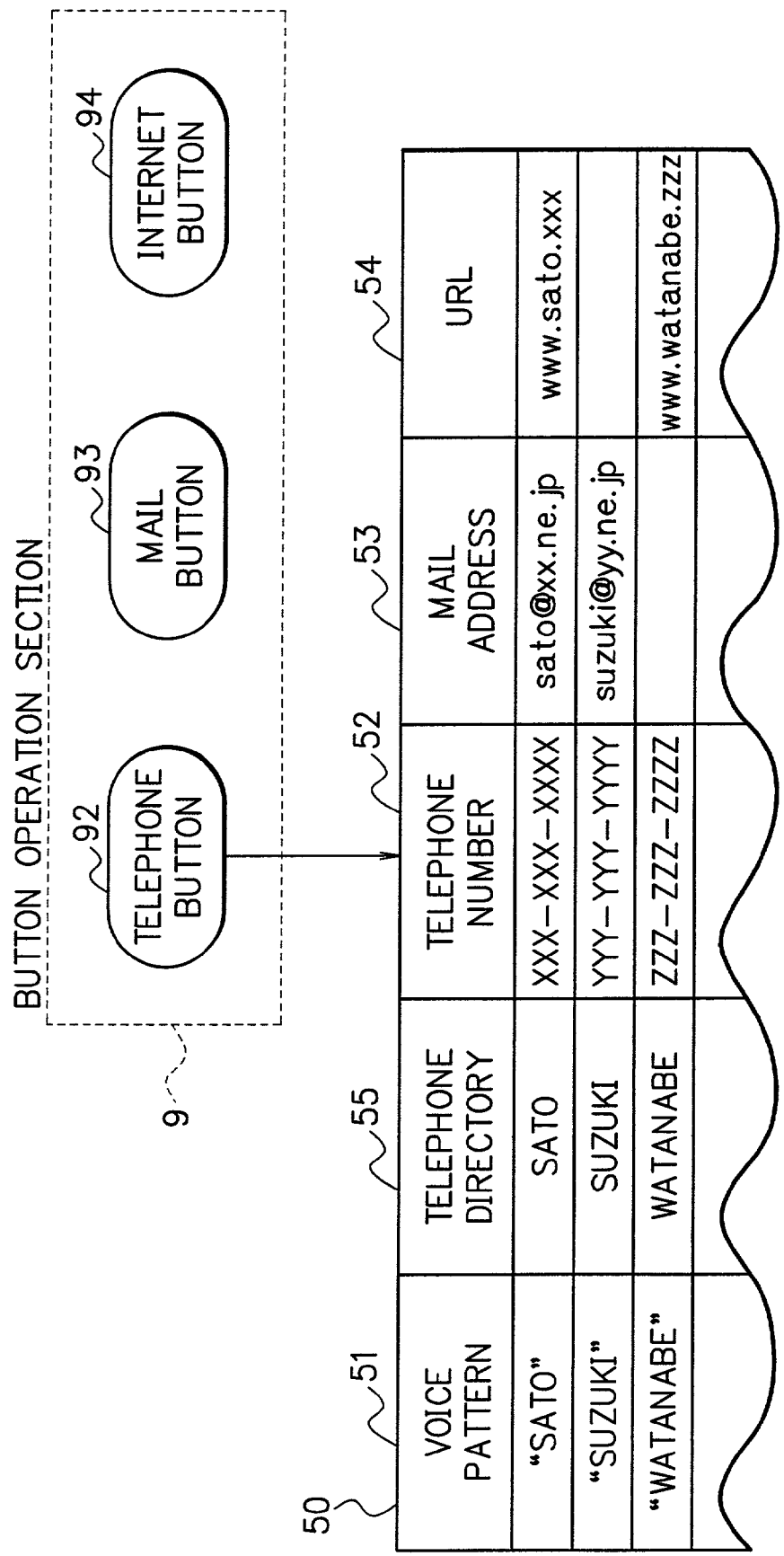
FIG. 3 is a table showing an example of a voice-data correspondence table which is employed in the mobile communications terminal of the first embodiment.

In the following, a speech recognition method using the mobile communications terminal of this embodiment will be explained referring to FIG. 2 and FIG. 3. FIG. 3 is a table showing an example of the voice-data correspondence table which is employed in the mobile communications terminal of the first embodiment.

First, the user of the mobile communications terminal sounds out the name etc. of a person with whom the user wants to make contact. The voice of the user is received by a handset, microphone etc. of the voice input section 1 and the received voice signal is transferred to the speech recognition section 2. The speech recognition section 2 obtains voice data by analyzing and recognizing the voice signal, and compares the obtained voice data with one or more voice patterns 51 that have been registered and stored in the voice search processing section 5.

Concretely, the speech recognition section 2 extracts features from the voice waveform signal by means of digital signal processing based on FFT (Fast Fourier Transform), LPC (Linear Predictive Coding), etc., and compares the extracted features with the prepared voice patterns 51 by means of stochastic/statistical methods.

The prepared voice patterns 51 are standard and referential voice patterns corresponding to "kana" (Japanese syllables), alphabets etc. The standard voice patterns are generated by estimating HMM (Hidden Markov Model) stochastic parameters from voice samples of a large number of speakers.

The user previously registers textual information corresponding to names such as "SATO", "SUZUKI", "WATANABE", etc. The words to be spoken by the user and the voice patterns 51 to be registered previously are not limited to exact names, but can also be nicknames etc. If an edit function is provided to the voice search processing section 5, a voice pattern 51 which has already been registered corresponding to an individual can be altered easily. Such an edit function is helpful when two or more individuals having the same second name (or first name) have to be registered.

The voice patterns 51 which are previously registered in the voice search processing section 5 can also be generated by employing a dictionary (which includes phonetic symbols) in the voice search processing section 5. In such cases, phonetic symbols corresponding to the registered textual information (such as "Johnson") are retrieved from the dictionary, and a voice pattern 51 corresponding to the textual information is generated by use of the phonetic symbols so as to be registered in the voice search processing section 5. If voice patterns for words are inherently included in the dictionary, a voice pattern 51 corresponding to the textual information can directly be retrieved from the dictionary. It is also possible to carry out the registration of voice patterns 51 by directly obtaining the voice patterns 51 by recording voice of the user sounding out the names etc.

In the comparison by the speech recognition section 2, if the obtained voice data matched or nearly matched a voice pattern 51 which has been registered in the voice search processing section 5, the voice-data correspondence table 50 which is shown in FIG. 3 is referred to by use of the voice pattern 51. By the reference to the voice-data correspondence table 50, one of the registered telephone directories 55 is called up. The retrieval of a telephone directory 55 from the voice-data correspondence table 50 is conducted by the memory search processing section 3. The result of the search for a telephone directory 55 is displayed to the user by the display section 4. Incidentally, a one-to-one correspondence exists between the voice patterns 51 and the telephone directories 55, and thus there is no case where two or more telephone directories 55 are called up for a voice patterns 51.

How to call up the aforementioned various personal data from a voice pattern 51 will be explained referring to FIG. 3. In this embodiment, each voice pattern 51 corresponds to the name of a telephone directory 55. In a telephone directory 55 that is found by the search of the voice-data correspondence table 50 by use of the voice pattern 51, a telephone number 52, a mail address 53 and a URL 54 have been registered as personal data.

When the TELEPHONE button 92 of the button operation section 9 is pushed by the user and voice is inputted to the voice input section 1, a telephone number 52 corresponding to the voice is searched for and called up. For example, if the user sounded out "SATO", a telephone directory 55 named "SATO" is searched for and found out and thereby a telephone number 52 "XXX-XXX-XXXX" is called up. In this case, other types of personal data (mail address 53, URL 54) corresponding to the "SATO" are not called up. If no telephone number 52 has been registered in the retrieved telephone directory 55 corresponding to "SATO", a message such as "NO TELEPHONE NUMBER REGISTERED" is displayed by the display section 4. Also when the MAIL button 93 or the INTERNET button 94 is pushed by the user, a specific type of data (mail address 53, URL 54) corresponding to the pushed button is called up similarly.

While the "TELEPHONE button" 92, the "MAIL button" 93 and the "INTERNET button" 94 for designating the type of personal data to be called up were provided to the mobile communications terminal in the above explanation, the names of the buttons and the types of personal data to be called up are not particularly limited. The buttons are not restricted to ON/OFF buttons. Any type of button assignment is possible if the data type designation is possible. As mentioned before, it is also possible to carry out the data type designation automatically based on the current operation mode (application activation status) of the mobile communications terminal (calling up a URL 54 when a Web browser has been activated, for example). In such cases, the button operation for the data type designation becomes unnecessary.

After a specific type of personal data is called up, the personal data can be displayed on the display section 4. According to the called or retrieved personal data, communication (call origination, sending E-mail, or access to the Internet) is started by use of the communication control section 6, the transmission/reception section 7 and the antenna 8.

Embodiment 2

Figure 4:
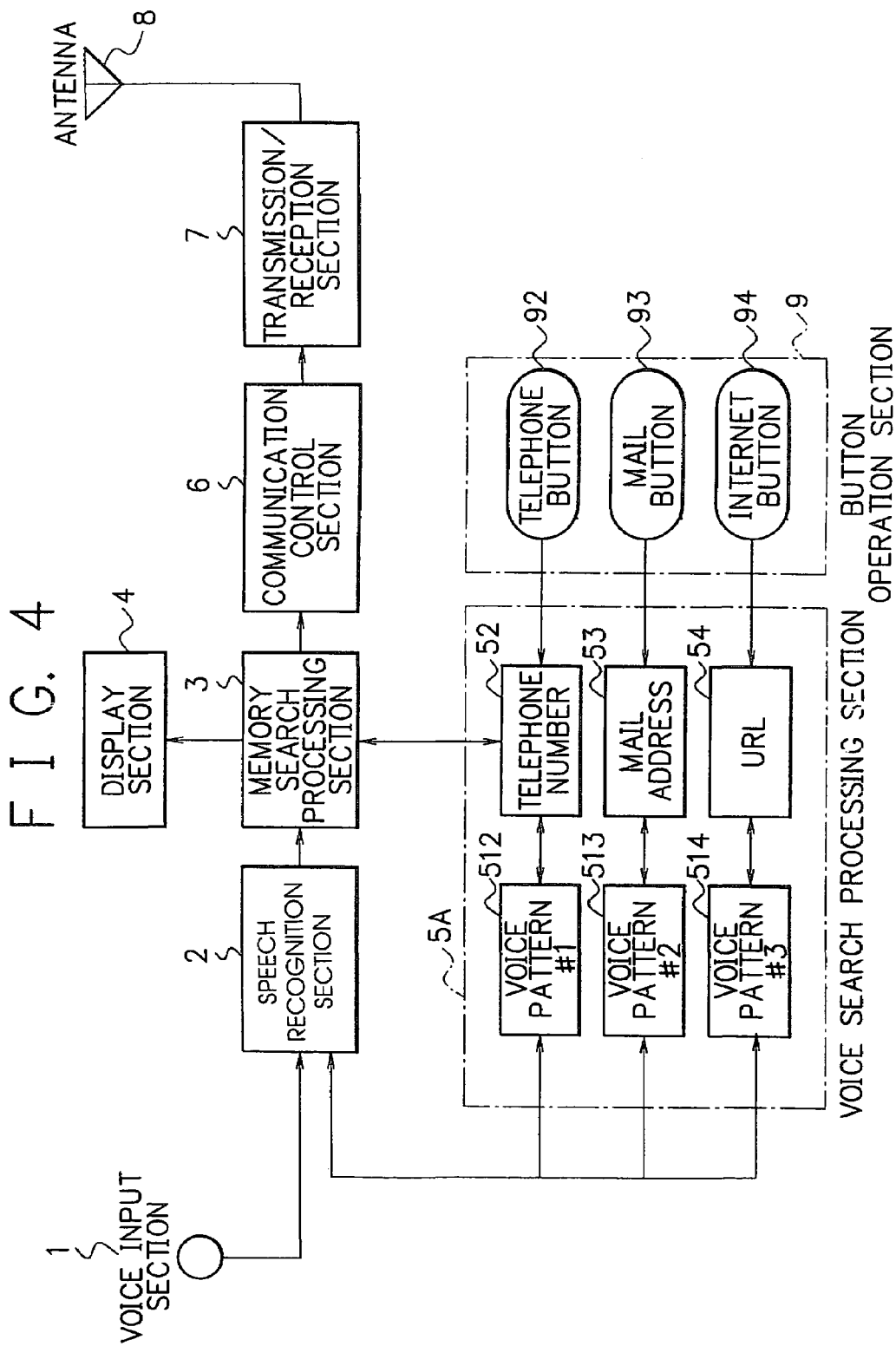
FIG. 4 is a block diagram showing an example of the composition of a mobile communications terminal in accordance with a second embodiment of the present invention.

In the following, a mobile communications terminal in accordance with a second embodiment of the present invention will be explained referring to figures. FIG. 4 is a block diagram showing an example of the composition of the mobile communications terminal of the second embodiment. The mobile communications terminal of the second embodiment has a voice search processing section 5A which is different from the voice search processing section 5 of the first embodiment. The other parts of the mobile communications terminal are the same as those of the first embodiment and thus repeated description thereof is omitted for brevity.

In the voice search processing section 5A of the second embodiment, voice patterns are stored in three tables: a table 512 which stores voice patterns #1 for calling up telephone numbers 52; a table 513 which stores voice patterns #2 for calling up mail addresses 53; and a table 514 which stores voice patterns #3 for calling up URLs 54. Registration (storage) of two or more same voice patterns 51 in a table (512, 513, 514) is prohibited. Registration of two or more same voice patterns 51 in different tables is possible.

Figure 5:
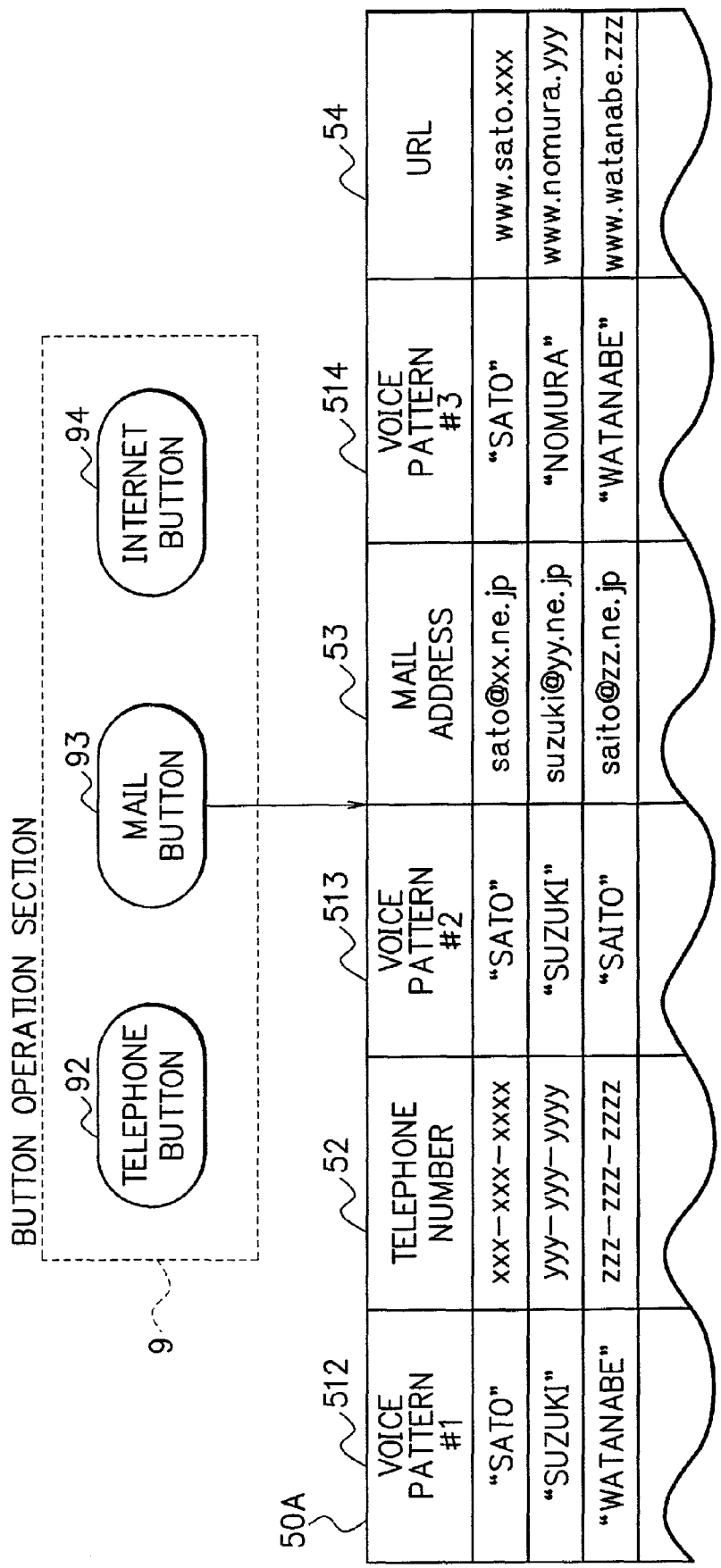
FIG. 5 is a table showing an example of a voice-data correspondence table which is employed in the mobile communications terminal of the second embodiment.

FIG. 5 is a table showing an example of a voice-data correspondence table which is employed in the mobile communications terminal of the second embodiment. Referring to FIG. 5, one of the tables 512, 513 and 514 included in the voice-data correspondence table 50A is selected based on button operation by the user to the button operation section 9 and thereby desired personal data (telephone number 52, mail address 53 or URL 54) is called up. While only one table was used in the first embodiment, N (N≧2) tables corresponding to N genres (N data types) are used in the second embodiment. In the example of FIG. 5, three tables corresponding to telephone number 52, mail address 53 and URL 54 are used. The search for personal data is conducted to a selected table at a time, therefore, a high speech recognition rate can be maintained.

For example, when the MAIL button 93 of the button operation section 9 is pushed by the user, the table 513 storing the voice patterns 2 is activated. If the user sounded out "SUZUKI" to the voice input section 1, a mail address "suzuki@yy.ne.jp" can be called up. As mentioned before, the data type designation (table selection from the tables 512, 513 and 514) can also be done based on the current operation mode (application activation status) of the mobile communications terminal without the use of the button operation section 9 (activating the table 513 storing the voice patterns 2 when an E-mail software has been activated, for example).

In the first embodiment, a telephone directory 55 corresponding to an individual is called up by the search, therefore, there are cases where no personal data is called up (if one or more of the three data types of the called telephone directory 55 are vacant as in the telephone directory "SUZUKI" in FIG. 3 having no URL 54). On the other hand, in the second embodiment in which voice patterns are registered with regard to each data type, personal data is necessarily called up if a voice pattern could be selected and retrieved by speech recognition. Therefore, the total number of data that can be registered as targets of voice calling can be increased in comparison with the first embodiment.

In the second embodiment, the total number of voice patterns that can be registered in the mobile communications terminal is larger than that of the first embodiment since the voice patterns are managed by use of a plurality of tables. Similarly to the first embodiment, the mobile communications terminal of the second embodiment can manage a large number of personal data while maintaining a high speech recognition rate. The mobile communications terminals of the embodiments have improved operability in comparison with conventional mobile communications terminals employing speech recognition techniques since probability of error or misretrieval (erroneously retrieving a different and similar voice pattern) in speech recognition can be reduced and thereby communication can be started with reliability.

The speech recognition methods which have been described above can be implemented by use of computer programs. Such programs can be distributed and provided to the mobile communications terminals by use of magnetic record media, optical record media, semiconductor record media, etc., or can be downloaded to the mobile communications terminals through networks by use of FTPs (File Transfer Protocols).

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

For example, while three items (telephone number, mail address and URL) were included in the personal data types in the above embodiments, many of people of these days possess mobile communications terminals such as cellular phones in addition to fixed telephones which are installed in houses. Therefore, it is also possible to divide the item "telephone number 52" into "fixed telephone number" and "cellular phone number" and thereby employ four items (fixed telephone number, cellular phone number, mail address and URL).

It is also possible to let the user register both a fixed telephone number and a cellular phone number in the item "telephone number 52" and let both phone numbers called up when the TELEPHONE button 92 is pushed by the user. In this case, the two phone numbers are displayed on the display section 4 and one of the phone numbers selected by the user is dialed. If there is no response for the call origination, the other phone number can be dialed immediately if the user wishes. It is also possible to automatically execute the call origination using the second phone number when there is no response for the call origination using the first phone number (selected by the user).

While the words "individual", "person", "personal data", etc. have been used in the above description, the targets of data registration and communication are of course not limited to individuals. Data (telephone number 52, mail address 53, URL 54, etc.) of companies, offices, shops, schools, groups, etc. with which communication is possible can also be registered and used in the mobile communications terminals in accordance with the present invention.

As set forth hereinabove, in the mobile communications terminal and the speech recognition method for mobile communications terminals in accordance with the present invention, two or more types of data to be used for starting communication can be called up by use of a voice pattern. Data of a desired data type (telephone number, mail address, URL, etc.) can be called up selectively and independently by means of the button operation or based on the application activation status of the mobile communications terminal. Therefore, the user is released from the troublesome operation and low operability of mobile communications terminals having the diversifying communication functions.

A high speech recognition rate can be maintained even if the number of data of individuals etc. registered in the mobile communications terminal became large since the number of voice patterns that have to be registered in the mobile communications terminal can be made relatively small. In the first embodiment, the number of voice patterns that have to be registered in the mobile communications terminal is reduced by registering each voice pattern (which is used for speech recognition) in a one-to-one correspondence with a telephone directory which includes various types of data. In the second embodiment, the voice patterns are registered with regard to each data type independently.

What is claimed is:

1. A mobile communications terminal comprising:
   a voice pattern registration means for storing voice patterns in a memory and registering the voice patterns that have been stored in the memory with a plurality of contact data, said plurality of contact data comprising a plurality of types of contact data, wherein for each type of contact data, a voice pattern stored in the memory is registered with a corresponding contact data item independent of other contact data types;
   a data type designation means for designating the type of contact data to be selected for communication;
   a speech recognition means for retrieving a voice pattern among the voice patterns stored in the memory that matches or nearly matches voice data obtained from a user; and
   a memory search processing means for selecting a contact data item of the type designated by the data type designation means that corresponds to the voice pattern retrieved by the speech recognition means,
   wherein the voice pattern registration means registers a different voice pattern to each contact data item of the plurality of types of contact data separately.

2. A mobile communications terminal as claimed in claim 1, wherein the plurality of types of contact data comprises telephone number contact data, electronic mail address contact data and URL (Uniform Resource Locator) contact data, wherein the voice pattern registration means registers a different voice pattern to each of the telephone number contact data the electronic mail address contact data and the URL contact data.

3. A mobile communications terminal as claimed in claim 1, wherein the data type designation means designates the type of contact data based on a user input of contact data type and the memory search processing means searches only voice patterns which are registered to the type of contact data that is designated without searching voice patterns that are registered to types of contact data that have not been designated when selecting the contact data item that corresponds to the voice pattern retrieved by the speech recognition means.

4. A mobile communications terminal as claimed in claim 1, wherein the data type designation means automatically designates the type of contact data based on an application activation status of the mobile communications terminal and the memory search processing means searches only voice patterns which are registered to the type of contact data that is designated without searching voice patterns that are registered to types of contact data that have not been designated when selecting the contact data item that corresponds to the voice pattern retrieved by the speech recognition means.

5. A mobile communications terminal as claimed in claim 1, further comprising a display means for displaying the contact data item which is selected by the memory search processing means.

6. A mobile communications terminal as claimed in claim 1, further comprising a communication starting means for automatically starting communication with a contact corresponding to the contact data item which is selected by the memory search processing means.

7. A mobile communications terminal as claimed in claim 1, wherein the memory that stores the voice patterns, which are registered with the plurality of directories, is provided in the mobile communications terminal.

8. A mobile communications terminal as claimed in claim 1, wherein the voice patterns, which are registered with the plurality of contact data, are recorded from speech of the user and stored in the memory.

9. A speech recognition method for a mobile communications terminal, comprising the steps of:
   a voice pattern registration step in which voice patterns are stored in a memory and the voice patterns that have been stored are registered with a plurality of contact data, said contact data comprising a plurality of contact data types, wherein for each type of contact data, a voice pattern stored in the memory is registered with a corresponding contact data item independent of other contact data types;
   a data type designation step in which the type of contact data to be selected for communication is designated;
   a speech recognition step in which a voice pattern among the voice patterns stored in the memory that matches or nearly matches voice data obtained from a user is retrieved; and
   a memory search step in which a contact data item of the type designated in the data type designation step that corresponds to the voice pattern retrieved in the speech recognition step is selected, wherein a different voice pattern is registered to each contact data item of the plurality of type of contact data separately in the voice pattern registration step.

10. A speech recognition method for a mobile communications terminal as claimed in claim 9, wherein the plurality of types of contact data comprises telephone number contact data, electronic mail address contact data and URL (Uniform Resource Locator) contact data, wherein a different voice pattern is registered to each of the telephone number contact data, the electronic mail address contact data, and the URL contact data in the voice pattern registration step.

11. A speech recognition method for a mobile communications terminal as claimed in claim 9, wherein the type of contact data is designated based on a user input of contact data type in the data type designation step and only voice patterns which are registered to the type of contact data that is designated are searched in the memory search step without searching voice patterns that are registered to types of contact that that have not been designated when selecting the contact data item that corresponds to the voice pattern retrieved in the speech recognition step.

12. A speech recognition method for a mobile communications terminal as claimed in claim 9, wherein the type of contact data is automatically designated based on an application activation status of the mobile communications terminal in the data type designation step and only voice patterns which are registered to the type of contact data that is designated are searched in the memory search step without searching voice patterns that are registered to types of contact that that have not been designated when selecting the contact data item that corresponds to the voice pattern retrieved in the speech recognition step.

13. A speech recognition method for a mobile communications terminal as claimed in claim 9, further comprising a display step in which the contact data item which is selected in the memory search step is displayed.

14. A speech recognition method for a mobile communications terminal as claimed in claim 9, further comprising a communication starting step in which communication with a contact corresponding to the contact data item which is selected in the memory search step is automatically started.

15. A speech recognition method for a mobile communications terminal as claimed in claim 9, wherein the memory that stores the voice patterns, which are registered with the plurality of directories, is provided in the mobile communications terminal.

16. A speech recognition method for a mobile communications terminal as claimed in claim 9, wherein the voice patterns, which are registered with the plurality of contact data, are recorded from speech of the user and stored in the memory.

17. A machine-readable medium storing a program for instructing a processor of a mobile communications terminal to execute a speech recognition process, wherein the voice recognition process comprises the steps of:

a voice pattern registration step in which voice patterns are stored in a memory and the voice patterns that have been stored are registered with a plurality of contact data, said contact data comprising a plurality of contact data types, wherein for each type of contact data, a voice pattern stored in the memory is registered with a corresponding contact data item independent of other contact data types;

a data type designation step in which the type of contact data to be selected for communication is designated;

a speech recognition step in which a voice pattern among the voice patterns stored in the memory that matches or nearly matches voice data obtained from a user is retrieved; and a memory search step in which a contact data item of the type designated in the data type designation step that corresponds to the voice pattern retrieved in the speech recognition step is selected, wherein a different voice pattern is registered to each contact data item of the plurality of type of contact data separately in the voice pattern registration step.

18. A machine-readable medium as claimed in claim 17, wherein the plurality of types contact data comprises telephone number contact data, electronic mail address contact data and URL (Uniform Resource Locator) contact data, wherein a different voice pattern is registered to each of the telephone number contact data, the electronic mail address contact data, and the URL contact data in the voice pattern registration step.

19. A machine-readable medium as claimed in claim 17, wherein the type of contact data is designated based on a user input of contact data type in the data type designation step and only voice patterns which are registered to the type of contact data that is designated are searched in the memory search step without searching voice patterns that are registered to types of contact that that have not been designated when selecting the contact data item that corresponds to the voice pattern retrieved in the speech recognition step.

20. A machine-readable medium as claimed in claim 17, wherein the type of contact data is automatically designated based on an application activation status of the mobile communications terminal in the data type designation step and only voice patterns which are registered to the type of contact data that is designated are searched in the memory search step without searching voice patterns that are registered to types of contact that that have not been designated when selecting the contact data item that corresponds to the voice pattern retrieved in the speech recognition step.

21. A machine-readable medium as claimed in claim 17, wherein the speech recognition process further comprises a display step in which the contact data item which is selected in the memory search step is displayed.

22. A machine-readable medium as claimed in claim 17, wherein the speech recognition process further comprises a communication starting step in which communication with a contact corresponding to the contact data item which is selected in the memory search step.

23. A machine-readable medium as claimed in claim 17, wherein the voice patterns, which are registered with the plurality of contact data, are recorded from speech of the user and stored in the memory.

24. A machine-readable medium as claimed in claim 17, wherein the voice patterns, which are registered with the plurality of contact data, are recorded from speech of the user and stored in the memory.

* * * * *